UNITED STATES PATENT OFFICE.

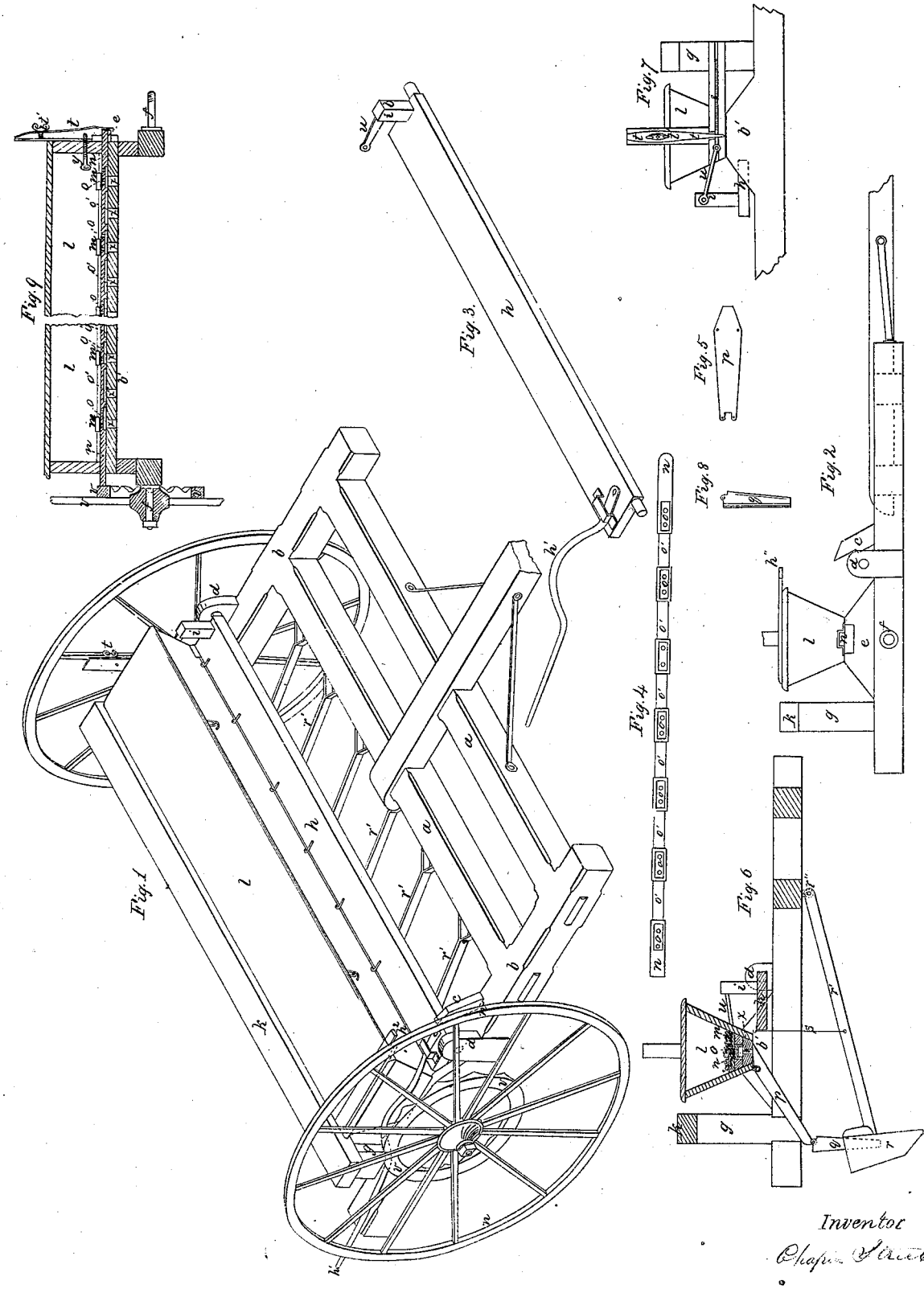

CHAPIN STREET, OF BARRE CENTRE, NEW YORK.

IMPROVEMENT IN GRAIN-DRILLS.

Specification forming part of Letters Patent No. 12,973, dated May 29, 1855.

*To all whom it may concern:*

Be it known that I, CHAPIN STREET, of Barre Centre, in the county of Orleans and State of New York, have invented a new and useful Improvement in Grain-Drills; and I do hereby declare that the following is a full and exact description thereof.

To enable others skilled in the art to make and use my invention, I will proceed to describe its construction and operation, reference being had to the accompanying drawings, forming a part of this specification, in which—

Figure 1 is a perspective view of my improvement. Fig. 2 is an end view of one portion detached. Fig. 3 is a view of the lifting-board. Fig. 4 is a bottom view of the seed-distributer; Fig. 5, hollow guide; Fig. 6, end section view; Fig. 7, view of the end opposite to Fig. 2; Fig. 8, tubular seed-guide; Fig. 9, side section.

Similar letters refer to like parts.

$a\ b\ g\ k\ b'$, frame of the machine; $c$, stop; $d$, bearing; $e$, sliding cam; $f$, axle-trees; $h$, lifting-board; $h'$, lever; $h^2$, notch; $i$, support; $l$, seed-box; $m$, seed-guards; $n$, seed-distributer; $o$, seed-chambers; $o'$, dust-box; $p\ q$, seed-guides; $r$, drills; $r'$, connecting-rod; $r^2$, bearing of the same; $s$, lifting-rope; $t$, distributer-spring; $t'$, adjusting-screw; $u$, connecting-rod; $v$, cam-wheel; $w$, wheels; $x$, seed-passage; $x'$, dust-holes; $y$, adjusting-screw.

The seed-box $l$ in my improvement is constructed in the usual manner and placed upon two wheels, $w$, with arms or axles attached in any substantial manner to the two side timbers $b\ b$ of the frame-work. The seed-box $l$ is elevated on these two side timbers by means of blocks placed on them. Upon one of the wheels there is attached an inner wheel, $v$, one surface of which is cut out so as to form a series of cams. A spring, $t$, at the other end of the machine presses upon one end of the distributer $n$. This seed-distributer passes through the bottom of the seed-box, the other end emerging and being pressed against the cam-wheel $v$. Consequently by the revolution of the wheel $w$ and the cam-wheel $v$ a reciprocating motion is communicated to the seed-distributer $n$. This seed-distributer is perforated with small holes on its upper surface, which pass through into small seed-chambers $o$ on the under side. The construction of this seed-distributer and the perforations may be seen by reference to Figs. 4, 6, and 9.

The bottom of $l$ is slotted longitudinally throughout its entire length, which permits the seed to fall on the top of the seed-distributer $n$. At equal distances on the bottom of the seed-box, and across the opening in the bottom of the seed-box, small metallic guards $m$ are attached. These guards are so arranged as to cover alternately the seed-holes in the distributer $n$. The guards $m$ also serve to prevent the seeds from clogging, for by the reciprocating motion of the distributer $n$, if any of the seeds become clogged, they are shaken apart and separated by contact with the guards $m$. The guards $m$ are elevated above the distributer $n$, varying according to the size of the grain to be sown—for wheat about one and one-eighth of an inch, and other grain accordingly.

The lower part of distributer $n$ rests on the frame $b'$. This frame is perforated at equal distances to correspond with the chambers $o$ in the seed-distributer $n$, and it is through these perforations $x$ that the seed, after having passed from the seed-box $l$ and through the distributer $n$ into the chambers $o$, falls into the guides $p$, and thence through $q$ into the drills $r$ and to the ground. The seed-guards $p$ are made trough-fashion, or open on the upper side their entire length. By this arrangement the operator will be enabled easily to detect any obstruction that may occur by observing an unequal flow of seed through the guides $p$. At their lower extremities the guides $q$ are attached or hinged, passing down within the cavity of the drill-spouts, but not attached to them nor governed by their motion. These guides are also hinged on the bottom of the seed-box by means of a wire passing through them and running longitudinally the entire length of the box, and supported by hooks driven into the bottom of the box $l$, so that when the drills are raised to their highest point of elevation the guides $p$ and $q$ are also allowed to rise with them without injury. They also have another important object—viz., by extending them back at a sufficient angle to allow the grain to flow freely. The drills may also be brought back from under the seed-box, where they are easy of access, and can be raised independently without the aid of machinery.

By the reciprocating motion of $n$ the seed-holes are exposed to the seed alternately. While one hole is presented to the seed the other hole is beneath the guard $m$.

The frame beneath the seed-box $l$ is also perforated at equal distances opposite and immediately beneath the dust-boxes $o'$. These dust-boxes, it will be perceived, are formed by making the seed-distributer $n$ a little smaller on its sides and on the bottom. This peculiar construction enables the seed-distributer $n$ to perform its movements without obstruction from friction or dust, the dust and grit being all collected into the dust-chambers $o'$, from whence it passes out of the machine through the apertures $x'$.

The quantity of seed sown is of course regulated by the action of the seed-distributer $n$. If $n$ is made to stand still, no seed will fall from the machine. The quantity which falls depends upon whether the distributer $n$ is allowed to move to the full depth of each cam on the wheel $v$. The movement of the distributer $n$ is regulated by the spring $t$, which bears upon one end. The strength with which the spring $t$ bears upon $n$ is regulated by the adjusting-screw $t'$. The distance which the spring presses is regulated by the adjusting-screw $y$. When the screw $y$ is drawn back, as seen in Fig. 9, the spring is allowed to give the distributer $n$ all the movement that the cam-wheel $v$ will permit; but by screwing up $y$ it is plain that the spring $t$ will be pushed away from the seed-distributer $n$. Consequently no movement will be given to $n$ by the cam-wheel $v$.

When it is desirable to sow only a given quantity of seed to the acre the movement to a fraction may be regulated by the screw $y$.

In going to and returning from a field or portion of a field, or in bringing the machine about after crossing a field, it is necessary that some means should be employed to stop the feed and also to commence it instantly. This is accomplished by the lever $h'$, which is attached to the lifting-board $h$, the latter passing across the machine in front of the seed-box, as seen in Fig. 1.

A support, $i$, to which is attached a connecting-rod, $u$, will be noticed at one end of $h$ in Fig. 3. This connecting-rod $u$ is fastened to the sliding cam $e$, which moves in a slot at one end of the machine, as shown in Fig. 7. By raising the lever $h'$ the lifting-board $h$ is also elevated and cam $e$ drawn forward by means of the connecting-rod $u$. The cam $e$, it will be observed, in moving forward, presses out the spring $t$, so that it cannot come in contact with the distributer $n$. Therefore as long as the lifting-board $h$ is retained in an elevated position the distributer $n$ will not move, and there will be no discharge of seed from the machine. The lifting-board $h$ also has another office. By means of small hooks upon its upper ends cords $s$ are fastened, which are attached to connecting-rod $r'$, the latter being hinged at $r^2$ and also with $r$.

In throwing up the lever $h'$ the connecting-rods $r'$ are also drawn up, and with them the drills $v$, so that not only is the seed stopped from discharging, but the drills are also lifted clear from all obstruction. The lever $h'$ is allowed to turn a little at the point of its attachment with $h$. This permits $h'$ to be fastened in a notch (seen at $h^2$) when it is elevated.

Having thus described my invention, I claim—

1. The seed-distributer $n$, with its seed-chambers $o$ and dust-boxes $o'$, in combination with the cam-wheel $v$, the spring $t$, and adjusting-screws $t'$ and $y$.

2. I do not claim the lifting-board $h$, nor the conductors $p$ and $q$, nor drills $r$, separately; but what I do claim is their peculiar arrangement and connection with the sliding cam $e$, as set forth.

CHAPIN STREET.

Witnesses:
B. MATISON,
B. G. MARTIN.